United States Patent Office 3,496,447
Patented Feb. 17, 1970

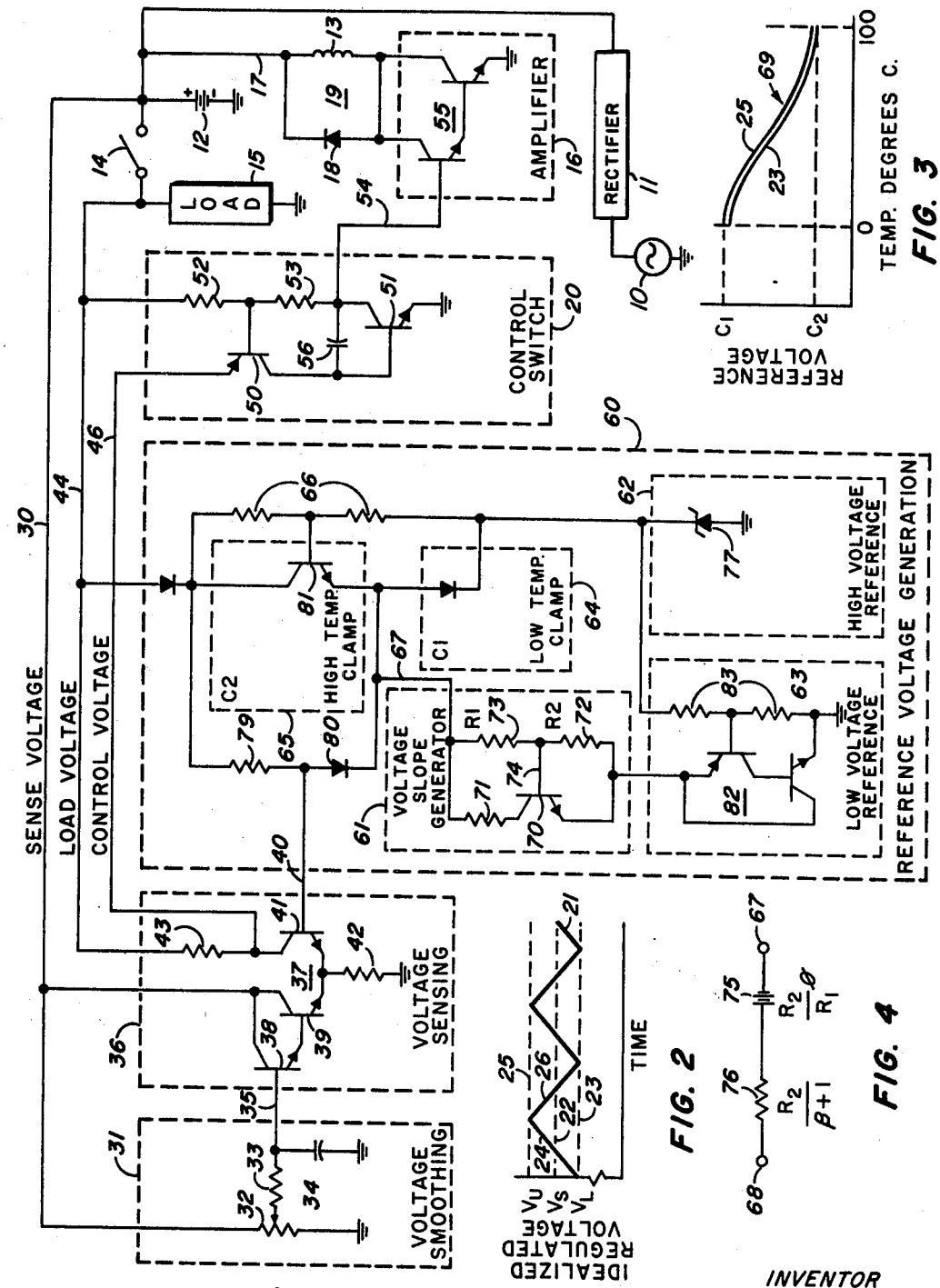

3,496,447
ALTERNATOR VOLTAGE REGULATION RESPONSIVE TO TEMPERATURE
James Elbert Thompson, Scottsdale, Ariz., assignor to Motorola, Inc., Franklin Park, Ill., a corporation of Illinois
Filed Dec. 26, 1967, Ser. No. 693,389
Int. Cl. H02h 7/06; H02p 11/04
U.S. Cl. 322—23   13 Claims

ABSTRACT OF THE DISCLOSURE

A vehicular alternator control circuit having a temperature responsive reference voltage generator which establishes a temperature controlled reference voltage compared with the battery or alternator generated voltage. The comparison results in a control signal which turns a control switch on and off for alternately supplying full voltage to the alternator field coil or none. A flywheel diode across the alternator field windings keeps the alternator generating voltage during periods of zero field voltage supply. A zone of voltage is provided between which the alternator voltage oscillates in magnitude and filter means are provided in the circuit for smoothing a response of the control circuit.

BACKGROUND OF THE INVENTION

This invention relates to the control of voltage generation and particularly to control of that voltage generation provided by a motor driven alternator.

It has been desired for several years to provide a completely solid-state control circuit for a vehicular motor driven alternator. Problems involved in the provision of a solid-state control circuit include the power dissipation capacity of the controlling element and the stability of the control circuit. Electronic or solid-state devices are much faster than the alternator response, and therefore, the design has to accommodate the difference in responsiveness. It is also desired that the entire control circuit be integrated on one monolithic silicon chip. To this end the number of components should be minimized. In some voltage regulator systems, such as those used in automotive electrical systems, the generated voltage should vary in accordance with temperature changes. At below 0° C., for example, the voltage generated by the alternator for charging a battery should be maximum since at the colder temperatures the battery requires a higher voltage to accept a given charge level. At the higher temperatures, it is desired to reduce the voltage generated such that the battery will not overcharge. Such temperature responsive voltage generators are also useful to supply electrical signals indicative of temperature at remote sites therefor.

SUMMARY OF THE INVENTION

It is an object of this invention to provide an improved control circuit for a vehicular alternator which facilitates integration thereof into a single monolithic silicon chip.

It is a further object of this invention to provide a solid-state alternator control circuit having a fast-acting temperature response to provide charging of a battery in accordance with temperature within a predetermined range.

It is a further object of this invention to provide a control circuit for a vehicular alternator having good stability and fast response.

It is another object to provide an improved temperature-responsive control circuit for a device which indicates its operational state by an electrical signal.

One embodiment of the present invention includes the features of a temperature responsive circuit having upper and lower output voltage amplitude limits and which voltage varies substantially inversely proportional to temperature between such limits. The temperature responsive generated voltage is used as a reference voltage and is supplied to a comparator in which it is compared with the voltage being generated. The comparator supplies a control voltage indicative of the difference in magnitudes. A control switch receives the control voltage and is responsive thereto to rapidly actuate an alternator field or other device or deactivate it. The control switch has voltage hysteresis for providing a zone in which the voltage generated by the alternator oscillates between an upper and a lower magnitude. Filter means may be provided to smooth out the oscillating voltage.

THE DRAWING

FIG. 1 is a schematic and block diagram of an embodiment of the present invention.

FIG. 2 is a graph illustrating an idealized output voltage wave form of the FIG. 1 circuit.

FIG. 3 is a graph showing the output voltage variation with respect to temperature of the FIG. 1 circuit.

FIG. 4 is a schematic diagram of an equivalent circuit for the temperature responsive portion of the FIG. 1 circuit.

DESCRIPTION OF THE ILLUSTRATIVE EMBODIMENTS

Referring now more particularly to the drawings, like numbers indicate like parts and structural features in the various diagrams.

Referring first to FIG. 1 there is shown in block and schematic form a control circuit embodying the teachings of the present invention together with an alternator shown in schematic form. The alternator 10 supplies an AC voltage to rectifier 11 which converts the same to a DC voltage for charging battery 12 to a predetermined voltage. Alternator 10 is inductively associated with the usual field coil 13. Ignition switch 14 selectively connects battery 12 to load 15 which schematically represents the various electrically operated devices in a vehicle. During the time that switch 14 is closed, amplifier 16 is alternately switched on and off by the later-described control circuit to selectively and repetitively draw current from battery 12 over line 17 through field coil 13. When amplifier 16 is nonconductive the energy stored in field coil 13 causes a current flow through diode 18 in the direction indicated by loop arrow 19. Therefore, during the period of nonconductance of amplifier 16, current continues to flow through field coil 13 to continue the generation of AC voltage in alternator 10. Diode 18 is referred to as a so-called "flywheel" diode in that it provides a current path for the coil 13 collapsing field caused current. Diode 18 also limits the voltage across field coil 13.

Amplifier 16 is controlled by control switch 20 which has voltage hysteresis for establishing a zone of voltage through which the amplitude output of rectifier 11 oscillates as described with respect to FIG. 2. Line 21 shows in idealized form the variation of the rectifier 11 output voltage with respect to time and represents the regulated voltage supplied by alternator 10. Alternator 10 output voltage is set at $V_s$ indicated by line 22 and has an upper limit, $V_u$, indicated by line 25 and a lower limit, $V_l$, indicated by line 23. The zone of voltage magnitudes between lines 23 and 25 is determined by control switch 20. The increasing voltage indicated by line 24 indicates the period of time during each control cycle when amplifier 16 is conducting current and thereby drawing current from battery 12 through coil 13. Decreasing voltage magnitude indicated by line 26 indicates the period of time during each control cycle when amplifier 16 is nonconductive and the voltage being generated is due to the loop current 19 flowing through flywheel diode 18. The zone 23, 25 in a twelve-volt vehicular system may be about 0.1 volt, for example.

Referring again to FIG. 1, battery 12 voltage is supplied over line 30 labeled "sense voltage" to voltage smoothing or filter circuit 31 for filtering the oscillatory portion 21 (FIG. 2) of the rectified voltage. Such oscillatory portion has a frequency between 1,000 hertz and 2,000 hertz, for example. Voltage smoothing circuit 31 may consist of voltage divider or potentiometer 32, resistor 33 and capacitor 34 connected as shown. The circuit is designed to eliminate the 1,000 hertz signal. The smoothed voltage is supplied over the line 35 to voltage sensing and comparison circuit 36. Circuit 31 is not required for successful operation of the system. For example, capacitor 56 in control switch 20 is sufficient to make the system nonresponsive to the oscillatory portion of the rectified voltage.

Voltage sensing circuit 36 consists of a differential amplifier 37 having one input circuit connected to line 35. Transistors 38 and 39 comprise a Darlington pair for providing a high input impedance from line 35 to differential amplifier 37. Transistor 39 also forms one-half of amplifier 37. A reference voltage from line 40 is supplied to the base electrode of transistor 41, the second half of differential amplifier 37.

Common-emitter resistor 42 provides bias for transistors 38, 39, and 41. Load resistor 43 is connected between the collector electrode of transistor 41 and load voltage line 44. The resultant comparison voltage is supplied as a control voltage over line 46 to control switch 20. Differential amplifier receives collector current on one side from sense voltage line 30 while on the other side load resistor 43 is connected to the load voltage line 44 and is therefore disconnected from battery 12 when switch 14 is opened. This connection is provided to prevent current drain from battery 12 when load 15 is not in use, i.e., the system is turned off.

Control switch 20 is recognized as a complementary type transistor switching pair consisting of PNP transistor 50 and NPN transistor 51. Resistance divider 52, 53 is connected to line 44 for supplying a supply voltage to the switch. When switch 14 is open, control switch 20 is nonconductive, i.e., open. It is well known that transistors 50 and 51 when connected as shown will switch to a highly conductive state when the voltage on line 46 reaches a certain positive magnitude with respect to ground reference potential. At a lower potential on line 46 with respect to ground reference potential transistors 50 and 51 will rapidly switch to a nonconductive state. When switch 20 is conductive, the voltage on line 54 is essentially at ground reference potential because of the low impedance of conductive transistor 51. As such, amplifier 16, shown as a Darlington connected transistor pair 55, is also nonconductive. However, when transistor 51 is nonconductive, a relative positive voltage is supplied over line 54 to make Darlington pair 55 highly conductive.

While it is desirable that the complementary transistors 50, 51 switch quite rapidly to reduce power dissipation in amplifier 16, the switching may be so fast that radio frequency interference from the rapidly changing field current may result. To slow down the switching of control switch 20, a filter capacitor 56 may be connected as shown.

The reference voltage on line 40 supplied to voltage sensing circuit 36 is generated by the reference voltage generation circuit 60 consisting of a temperature responsive voltage (slope) generator 61. Also included is high voltage reference 62 which sets low voltage reference circuit 63. The low reference voltage circuit 63 supplies a voltage pedestal for the temperature-responsive voltage-generation circuit 61, as will be described. The temperature responsiveness of the circuit 60 is limited to a maximum voltage C1 by low temperature clamp 64 and to a lower voltage amplified limit C2 by high temperature clamp 65 (see FIG. 3). Voltage divider 66 is used to provide a reference voltage to high temperature clamp 65. The voltage variation of circuit 60 is shown in FIG. 3 wherein at 0° C. the reference voltage on line 40 is at maximum amplitude C1 determined by low temperature clamp 64 clamping the output line 40 to the high voltage reference 62. Similarly, at 100° C. the reference voltage on line 40 is clamped at lower-amplitude limit voltage C2 by clamp 65. Intermediate the temperature limits 0° C. and 100° C., the slope generator 61 supplies a voltage across its terminals 67 and 68 which varies inversely with temperature to provide a substantially linear slope 69, as shown in FIG. 3, between the limits of 0° and 100° C. Such voltage variation is useful to provide a constant charge rate to a battery irrespective of environmental temperature. At temperatures colder than 0° C. and warmer than 100° C. the voltage generated may vary slightly from the clamped magnitudes due to imperfect diode clamping action.

Operation of temperature responsive voltage generator 61 is now described. It will be shown that the voltage between generator terminals consisting of lines 67 and 68 varies inversely with respect to temperature between 0° and 100° C. Temperature variation is caused by a temperature responsiveness of the base-to-emitter junction or diode of transistor 70 which serves as a temperature sensing means. It is well known that such temperature characteristic is negative with respect to temperature, that is, as the temperature increases, the forward voltage drops across the diode decreases. The rate of change of a typical base-to-emitter diode or junction is about minus 2 millivolts per degree centigrade temperature change. The temperature responsive generator 61 can be analyzed as having two parallel current paths; one path comprising transistor 70 with current limiting resistor 71 and the second path comprising the voltage divider consisting of resistor 72 which in the following analysis has resistance value R2 and resistor 73 having resistance R1. First, it should be noted that the base-to-emitter diode of transistor 70 is in parallel circuit relation to resistor 72, and thereby, regulates or controls the voltage drop thereacross in accordance with the temperature responsive voltage drop normally associated with a forward-biased base-to-emitter diode. Such voltage has an amplitude $\phi$, the temperature responsive voltage across resistor 72.

Next, derivation of the equivalent circuit of the temperature responsive generator 61, is described to show the generator 61 temperature responsiveness. An electrical current, having amplitude I, flows from line 67 to line 68 through generator 61. The temperature responsive voltage generated in generator 61 as a result of such current flow is equal to $$\phi(R1+R2)/R2$$

This voltage can be viewed as a temperature responsive battery. Since generator 61 is not perfect, there is included in the equivalent circuit (not shown) a series resistance equal to $R1/(B+1)$, the dynamic impedance of generator 61. B is the base-to-collector current gain of transistor 70.

The current I, flowing from line 67 to line 68, is equal in magnitude to the sum of the currents flowing through transistor 70 and resistor 73. Since the emitter-to-base diode of transistor 70 determines the voltage across resistor 72, the current flow through resistor 72 need not be separately considered. The transistor 70 base current $i_b$, flowing on line 74, controls the current conductivity of transistor 70. Therefore, the current flowing from the collector electrode to the emitter electrode of transistor 70 (also the current through resistor 71) is equal to B $i_b$, wherein B is the current gain of transistor 70. The current through resistor 73 has two components. The first current component also flows through resistor 72 and has an amplitude $\phi/R2$, it being remembered that the voltage across resistor 72 is determined by the voltage drop across the base-to-emitter diode of transistor 70. The second component is the base current flowing over line 74 equal to $i_b$. Therefore, the total current I is represented as:

$$I = Bi_b + i_b + \phi/R2 \qquad (1)$$

The potential difference V between lines 67 and 68 is equal to the current I times the impedance of the circuit:

$$V = (\phi/R2 + i_b)R1 + \phi \qquad (2)$$

The above equation represents the voltage drop across the voltage divider 72, 73 with the left-hand term representing the voltage drop across resistor 73 (R1) while $\phi$ is the voltage drop across resistor 72.

Solving Equation 1 for the base current $i_b$:

$$i_b = (I - \phi/R2)/(B+1) \qquad (3)$$

Factoring Equation 2:

$$V = \phi(R1/R2) + R1i_b + \phi \qquad (4)$$

Substituting Equation 3 into Equation 4 and rearranging:

$$V = \phi(R1/R2) + \phi + R1(I - \phi/R2)/(B+1) \qquad (5)$$

Factoring:

$$V = \phi(R1/R2 + \phi + (R1)(I)/(B+1) - R1(\phi/R2)/(B+1) \qquad (6)$$

Factoring out the term $\phi$:

$$V = \phi\{R1/R2 + 1 - R1/[(R2)(B+1)]\} + IR1/(B+1) \qquad (7)$$

In Equation 7 the term on the left-hand side multiplied by $\phi$ is the temperature responsive generator portion while the right-hand term is the voltage drop due to the current I flowing through the incremental impedance $R1/(B+1)$, the temperature responsive voltage generator 61. In practice the term $$-R1/(R2)(B+1)$$

is negligible; the Equation 7 may be simplified to:

$$V = \phi(R1/R2 + 1) + IR1/(B+1) \qquad (8)$$

Equation 8 is a mathematical representation of the equivalent circuit (FIG. 4) of temperature responsive circuit 61 wherein the voltage between lines 67 and 68 is formed by the temperature responsive portion and an incremental and dynamic impedance portion.

At the low temperature of 0° the circuit 60 is designed such that the voltage at terminal 67 will be equal to or greater than the Zener or reverse avalanche voltage of diode 77 in high voltage reference circuit 62. Therefore, as circuit 61 tends to provide a higher voltage than the Zener voltage, diode clamp 64 becomes conductive to clamp the voltage on line 40 to the diode 77 Zener voltage C1. The circuit 60 receives its supply voltage from line 44 on the load side of ignition switch 14. Isolating diode 78 connects lines 44 to clamp 65 and to resistor 79. Diode 80 is provided in the circuit to provide temperature compensation for the clamping transistor 81 of circuit 65.

At the high end of the temperature range, i.e., 100° C., the voltage on terminal 67 and thence output line 40 has reduced magnitude due to the negative temperature characteristics of the transistor base-to-emitter diode and will tend to forward bias transistor 81. Even above 100° C. circuit 61 continues to reduce its voltage. However, when transistor 81 is forward biased due to the decreased voltage magnitude on terminal 67, further decrease voltage on terminal 67 is inhibited by the current conduction of transistor 81, which clamps the voltage on terminal 67 to the C2 magnitude. It should be noted that clamp 65 is in shunt connection to resistor 79 and line 40.

The terminal 67 voltage to ground magnitude is provided by the low voltage reference circuit 63, a "double-transistor emitter-follower" circuit 82 is driven by the voltage divider 83 to closely follow the high reference voltage provided by circuit 62 plus the series voltage generated in circuit 61.

As circuit 61 adjusts the line 40 reference voltage inversely with temperature changes, the control voltage on line 46 supplied from voltage sensing circuit 36 and zones 23, 25 are correspondingly adjusted in accordance with temperature changes.

It should be noted that the FIG. 1 circuit uses only one capacitor 34 in its design. If RF interference is generated, a second capacitor 56 can be added.

I claim:
1. A control circuit for voltage regulation of an alternator output voltage, including in combination,
   first sensing means for sensing the amplitude of the alternator voltage to be regulated and supplying a sense signal indicative of a sensed amplitude,
   second sensing means for sensing the magnitude of an independently variable phenomenon and supplying a reference signal indicative of a sensed magnitude,
   control circuit means including signal responsive ON-OFF semiconductor switching means exhibiting hysteresis characteristics in its switching responsiveness for establishing a zone of regulated voltage amplitudes having an upper limit and a lower limit and supplying an output signal indicating whether an ON or an OFF state exists in said ON-OFF switching means and the control circuit means adjusting said zone in accordance with said reference signal, said control circuit means being jointly responsive to said signals for supplying said output signal for actuating the alternator to continually change the output voltage amplitude between said limits with alternately increasing and decreasing amplitudes,
   and signal limiting means connected to said sensing means for limiting the range of said reference signal to limit the adjusting of said zone between a maximum upper amplitude for said upper limit and a minimum lower amplitude for said lower limit, and said second sensing means establishing a predetermined relationship between zone adjustment and changes in magnitude of said phenomenon intermediate said maximum and minimum amplitudes.

2. The circuit of claim 1 wherein said second sensing means includes in combination the following temperature responsive electrical circuit:
   first reference means establishing a first voltage magnitude,
   second reference means deriving a second voltage magnitude from said first magnitude such that said first and second magnitudes have a substantially constant relationship,
   temperature responsive voltage generation means connected to said second reference means and having an output terminal for supplying said reference signal indicative of temperature,
   said signal limiting means including first clamp means selectively connecting said output terminal to said first reference means in response to a predetermined relationship of said reference magnitude to said first voltage magnitude for limiting the magnitude of said reference signal to be no greater than said first voltage magnitude, and
   second clamp means connected to said output terminal and to said first reference means and responsive to a predetermined relation between said reference signal magnitude and said first voltage magnitude to supply additional current to said output terminal whereby a lower limit is provided for said reference signal magnitude.

3. The circuit of claim 2 wherein said first reference means comprises a Zener diode and said second reference means comprises an emitter-follower type circuit means having an input connection means including a voltage divided circuit connected to said Zener diode and having output connection means connected to said temperature responsive voltage generation means such that said reference signal magnitude is the summation of the voltage across said temperature responsive voltage generation means and said emitter-follower type circuit means.

4. The circuit of claim 1 wherein said first sensing means including a semiconductor voltage comparator of the differential amplifier type and operative to compare said sense signal and said reference signal to supply a control signal indicative of any amplitude differential between said sense signal and said reference signal, said ON-OFF switching means comprising a semiconductor type switch and responsive to said control signal to switch between current conducting (ON) and current nonconducting (OFF) electrical states, said control means further having an amplifier receiving said output signal of said switching means and responsive thereto to selectively provide a current conductive path or a current blocking path indicative, respectively, of a sense signal amplitude being too low or too high.

5. Temperature controlled voltage generation wherein electrical current in a field coil actuates voltage generation in an alternator having connecting means for converting generated AC voltage to DC voltage, means to sense the amplitude of the DC voltage, comparison means for receiving a sensed voltage for comparing such voltage with a reference voltage, the improvement including the following control circuit in combination, temperature responsive reference signal generation means responsive within a predetermined temperature range to supply a reference signal of an amplitude varying in inverse proportion to temperature changes and including means for limiting the upper and lower magnitudes of said reference signal at the extremities of said temperature range, the comparison means receiving said reference signal and supplying a control signal indicative of the instant comparison between the sense voltage and said reference signal, switch means connected to the field coil for controlling current flow therethrough and receiving said control signal and responsive thereto to switch to first conductive state when said control signals indicate the sensed voltage has a first relationship to said reference signal and switch to a second conductive state when the sensed voltage has a second relationship to said reference signal.

6. The circuit of claim 5 further including a switch connected to selectively pass current from the converting means to a load and the improvement further including in combination, electrical connections from the load to said temperature responsive generation means and said switch means for supplying electrical power thereto, and electrical connections from said converting means to said comparison means for supplying said sensed voltage thereto and isolation means electrically interposed between the load and said temperature controlled voltage generation means for causing said reference signal to indicate no voltage is to be generated.

7. The circuit of claim 6 further including a diode connected across the field coil and poled to oppose current flowing through the field coil when said switch means is in said first conductive state and the DC voltage is continually varying in magnitude between said upper and lower amplitude limits with said variations being not greater than 1% of an average magnitude of such voltage.

8. A temperature responsive alternator control circuit having an output amplifier for being connected to the field coil of an alternator and input means for receiving rectified voltage from the alternator with small amplified high frequency variations such that the rectified voltage is maintained at a certain average amplitude.

the improvement including a combination, a voltage smoothing circuit connected to said input means for receiving the rectified voltage and supplying a sensed signal without such small amplitude variations, a differential voltage sensing circuit having first and second input terminals and an output terminal and supplying a control signal on said output terminal indicative of voltage magnitude relationship of signals on said input terminals, said first input terminal connected to said smoothing circuit, temperature responsive reference voltage generation means receiving the rectified voltage and having a voltage reference terminal connected to said second input terminal, a first voltage dividing network including voltage reference means supplying a high voltage reference signal, a second voltage dividing network receiving said high voltage reference signal and supplying a low voltage reference signal, emitter-follower amplifier means receiving said low voltage reference signal and providing a signal path, the electric conductivity of which is determined by said low voltage reference signal, a slope generating temperature responsive variable impedance connected to said emitter-follower amplifier means and to said voltage reference terminal, voltage supplying circuit means receiving said rectified voltage and connected to said voltage reference terminal such that a voltage reference signal is supplied having an amplitude varying with temperature, first clamp means in said reference voltage generation means electrically connected between said voltage reference terminal and said voltage reference means to clamp said voltage reference signal to a maximum amplitude directly related to said high voltage reference signal, second clamp means in said reference voltage generation means electrically connected across said voltage suplying circuit means and connected at a first point to said first voltage dividing network and responsive to a predetermined voltage differential between said first point and said slope generating impedance means to provide a current path supplying current to said impedance means for providing a lower limit on the magnitude of said voltage reference signal, two conductive-state-control switch means having voltage hysteresis characteristics receiving said control signal and responsive thereto to supply a digital field control signal, the output amplifier having a first and second signal state in accordance with the amplitude of the control signal such that full field current or no field current flows through said output amplifier, respectively.

9. The circuit of claim 8 wherein said first dividing network voltage reference means comprises a Zener diode poled to conduct current in the reverse direction, said first clamp means comprises a diode poled to conduct current whenever said voltage reference signal magnitude exceeds the magnitude of the voltage on said Zener diode, said second clamp means comprises a transistor having a base electrode and two conductive path electrodes with said base electrode connected to said first point and main electrode connected respectively to said slope generating impedance means and said voltage supplying circuit means, and a diode connected between said slope generating impedance means and said voltage reference terminal and poled to conduct current in the same direction as said first clamp means for providing temperature compensation for said second clamp means transistor.

10. A control circuit for exercising ON-OFF control over a device which supplies a sense signal indicative of its operational state and is responsive to ON-OFF electrical control signals to adjust its operational state,
the improvement including in combination,
first sensing means for sensing said sense signal,
second sensing means for sensing the magnitude of an independently variable phenomenon and supplying a reference signal indicative of a sensed magnitude,
control circuit means including signal responsive ON-OFF semiconductor switching means exhibiting hysteresis characteristics in its switching responsiveness for establishing a zone of sense signal amplitudes having an upper limit and a lower limit and supplying an output signal indicating whether an ON or an OFF state exists in said ON-OFF switching means and the control circuit means adjusting said zone in accordance with said reference signal, said control circuit means being jointly responsive to said sense and reference signals for supplying said output signal for actuating the device to continually adjust its operational state to supply a continually charging sense signal amplitude between said limits with alternately increasing and decreasing amplitudes,
and signal limiting means connected to said sensing means for limiting the range of said reference signal to thereby limit the adjusting of said zone to a predetermined amplitude of said sense signal and establishing a predetermined realtionship between zone adjustment and changes in magnitude of said phenomenon at other amplitudes of said sense signal.

11. The control circuit of claim 10 wherein said limiting means has portions respectively to limit the adjusting of said zone between a maximum upper amplitude for said upper limit and a minimum lower amplitude for said lower limit and said second sensing means establishing a predetermined relationship between zone adjustment and changes in magnitude of said phenomenon intermediate said maximum and minimum amplitudes.

12. The control circuit of claim 11 wherein said phenomenon is temperature.

13. The control circuit of claim 12 wherein said limiting means portions are separate clamp means,
one of said clamp means being in parallel circuit relation to said second sensing means for limiting the reference signal to a maximum amplitude, and another of said clamp means being in series circuit relation to said second sensing means to supply an additional electrical signal whenever said reference signal magnitude is less than said minimum lower magnitude such that said reference signal and said additional signal are added to equal at least said minimum lower magnitude.

References Cited

UNITED STATES PATENTS

| | | | |
|---|---|---|---|
| 2,686,287 | 8/1954 | Gerg | 322—23 |
| 3,241,028 | 3/1966 | Mas | 322—33 X |

ORIS L. RADER, Primary Examiner

H. HUBERFELD, Assistant Examiner

U.S. Cl. X.R.

322—24, 28, 33, 73